Figure 1:
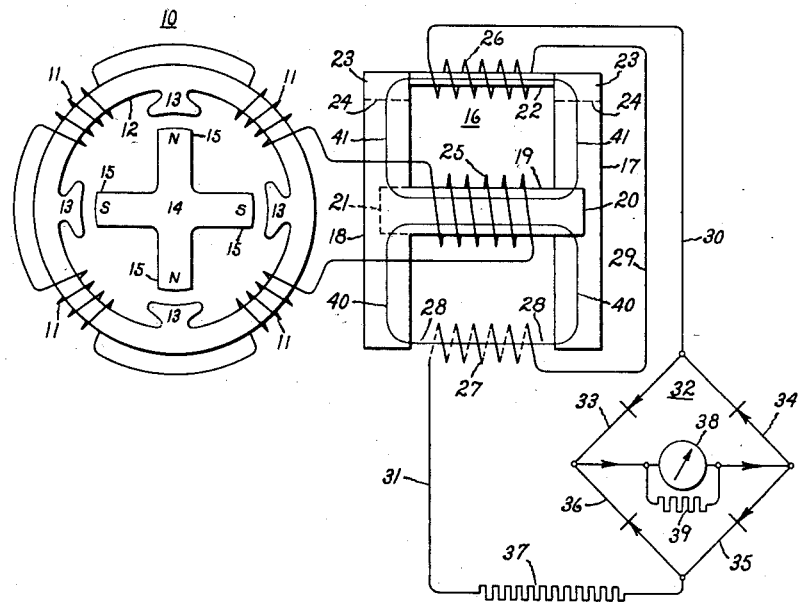

Dec. 8, 1931.  A. J. ROHNER  1,835,969

TRANSFORMER

Filed Aug. 18, 1930

MAXIMUM TRANSFORMER MAGNETOMOTIVE FORCE

Inventor:
Arnold J. Rohner,
by Charles E. Tullar
His Attorney.

Patented Dec. 8, 1931

1,835,969

UNITED STATES PATENT OFFICE

ARNOLD J. ROHNER, OF SCHENECTADY, NEW YORK, ASSIGNOR TO GENERAL ELECTRIC COMPANY, A CORPORATION OF NEW YORK

TRANSFORMER

Application filed August 18, 1930. Serial No. 475,970.

My invention relates to a transformer of novel construction.

My invention is especially suitable for indicating the speed of aircraft engines and will be described in connection with such use but it will be evident from the description that it is equally suitable for indicating the speed of any moving element or for indicating the frequency of alternating current systems or for any purpose where it is desired to employ the characteristics possessed by my transformer.

During the operation of aircraft it is important that the pilot should have on his instrument panel an instrument indicating the engine speed. A mechanically operated speed indicator involves complications such as flexible shafts etc., and hence it is desirable to have an electrically operated speed indicator. The usual electrical speed indicator consists of a small alternating current generator driven by the aircraft engine, the generator having a permanent magnet and on the instrument panel there is a voltmeter connected to the armature of the generator, the voltmeter being calibrated to read in R. P. M. Theoretically the generator voltage should be directly proportional to the engine speed whereby the voltmeter would accurately indicate the engine speed but practically this is not so because the strength of the permanent magnet changes with age, vibration and temperature variation, the latter being especially severe on aircraft. In addition the variation in temperature changes the resistance of the armature and voltmeter windings causing further errors and thus the voltmeter will not accurately indicate engine speeds under various operating conditions or after an extended operating period.

I overcome the above named disadvantages by interposing a transformer of novel construction between the generator and the indicating instrument. The transformer has a primary winding energized by the generator, two secondary windings and a core having two magnetic circuits, one of the circuits containing a restricted magnetic section becoming substantially saturated during a part of each alternation of the generator voltage during the indicating range and the other circuit containing an air gap or a section having a reluctance substantially that of air. One secondary winding surrounds a part of the magnetic circuit having the restricted section and the other secondary winding is threaded by the flux of the other magnetic circuit. The two secondary windings are connected in series so that their induced voltages oppose each other and their resultant voltage operates the indicating instrument. The number of turns in the secondary windings and the reluctance of their respective magnetic circuits are so proportioned that during the indicating range the resultant voltage is substantially proportional to the generator frequency and hence the indications of the instrument will be substantially proportional to the generator speed.

In the preferred embodiment of my invention, I use a simple form of rectifier for rectifying the current delivered by the secondary windings of the transformer referred to, thereby permitting me to employ a direct current instrument to indicate the speed and thus obtaining easy reading speed indications since such an instrument has equal deflections for equal increments of voltage applied to the instrument. I will therefore describe my invention in connection with a direct current indicating instrument and a rectifier interposed between the instrument and its energizing windings but it is to be understood that my invention is not limited to the indicating means described.

My invention will be best understood from the following description when considered in connection with the accompanying drawings while the features of my invention which are believed to be novel and patentable are set forth in the appended claims.

Figure 2:
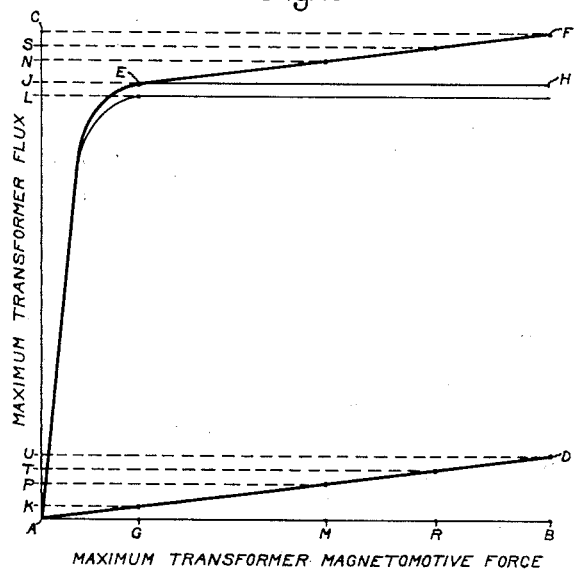

Fig. 1 shows a preferred embodiment of my invention using an alternating current magneto generator, a transformer so constructed that its secondary winding gives an alternating voltage whose average value is substantially proportional to the frequency of the magneto, a rectifier to convert the alternating current into direct current and a direct current instrument energized by this direct current. Fig. 2 represents magnetization curves of the transformer useful in explaining the advantageous results obtainable with my invention.

In Fig. 1, 10 represents the alternating current magneto generator consisting of stationary armature windings 11 placed on the magnet frame 12 having pole pieces 13. The rotatable permanent magnet 14 has pole pieces 15 whose polarities are as shown by their letters N and S. The magnet 14 is rotated by the aircraft engine or other device using any suitable driving means. The transformer 16 consists of two sets of T-shaped laminations of magnetic material assembled so as to form a pair of laterally displaced substantially parallel legs 17 and 18 joined at their centers by a connecting leg 19 which consists of the corresponding projections of the legs 17 and 18 laid alternately overlapping each other as shown by the full and dotted lines 20 and 21 respectively. The legs 17, 18 and 19 are of sufficiently large cross-section not to become saturated and to have a substantially uniform permeability throughout the indicating range. Two corresponding ends of the legs 17 and 18 are bridged by a laminated leg of magnetic material having the restricted section 22 and two wide sections 23 as shown by the dotted lines 24, the purpose of the wide sections 23 being to obtain good magnetic contact with the legs 17 and 18. The section 22 is of sufficiently small cross-section to become saturated throughout the indicating range. The legs 17 and 18 have substantially the same dimensions and substantially the same reluctance. The ends of the winding 11 are connected to the primary winding 25 surrounding the leg 19. The secondary winding represented by 26 surrounds the restricted section 22. The secondary winding represented by 27 is placed in the air gap represented by 28 between the unbridged ends of the legs 17 and 18. The windings 26 and 27 have substantially the same diameter and number of turns and their respective axes are at substantially equal distances from the axis of the connecting leg 19. It is obvious that since the legs 17 and 18 are substantially parallel to each other the air gap 28 will have substantially the same length as the restricted section 22. The winding 27 may be held in the position shown by the same means which secure the transformer 16 in place, these means not being shown as they are immaterial to the explanation of my invention. If desired, other means may be used to hold the winding 27 in the position shown, for example the winding 27 may surround a piece of wood, brass or any other material having substantially the same reluctance as that of air and which is secured to the ends of the legs 17 and 18.

I wish it understood that when I refer to an air gap in the specification and claims I mean to include either an air gap or a section having a reluctance substantially equal to that of an air gap. The secondary windings 26 and 27 are connected in series by the lead 29 so that their induced voltages oppose each other and therefore the resultant voltage of the secondary windings is between the leads 30 and 31. The lead 30 is connected to one terminal of the copper oxide full wave rectifier 32 having sections 33, 34, 35 and 36. A high resistance 37 having a zero or slightly negative temperature coefficient is connected between the lead 31 and the other end of the rectifier 32. The millivoltmeter 38 is of the direct current type and is connected to be energized by the rectified current from 32 and the resistance 39 having a zero or slightly negative temperature coefficient is connected across 38. It is obvious that the construction of the transformer 16 as described permits machine wound primary and secondary windings to be placed in their respective positions, thus simplifying the construction and reducing the cost of the transformer.

It is preferable to now describe Fig. 2 because the results obtained by my invention can be best explained by simultaneously referring to Figs. 1 and 2. In Fig. 2, AB and AC respectively represent the maximum values of the magneto-motive force and flux of the transformer at different speeds of the generator 10, Fig. 1. The straight line AD and the curve AEF represent the flux threading the secondary windings 27 and 26 respectively, Fig. 1. The remaining lines and curves of Fig. 2 will be described in connection with the explanation of my invention.

It will be obvious that when the primary winding 25, Fig. 1, is energized, there will be an alternating magneto-motive force in the transformer and an alternating magnetic flux will thread the two transformer magnetic circuits represented by the lines 40 and 41. The magnetic circuit represented by 40 will have substantially the same reluctance as the air gap 28 because practically all the reluctance of this circuit is due to the reluctance of the air gap 28 since those parts of the circuit consisting of the legs 17, 18 and 19 are short and of large cross-section and in addition these legs are made of a material having a very low reluctance and a sharp knee near the saturation point on its magnetization curve, such material being for example the nickle iron alloy known as permalloy which is described in U. S. Patent No. 1,586,883. It follows that the flux threading the winding 27 will be substantially proportional to the transformer magnetomotive force and hence the maximum value of the flux threading the winding 27 may be represented by the straight line AD. The maximum flux threading the winding 26 at different values of transformer magnetomotive force is represented by the curve AEF, where E represents the condition of substantial saturation of the section 22, Fig. 1, which occurs at the magnetomotive force represented by G. It is well known to those skilled in the art that when a section of magnetic material becomes saturated it will offer a reluctance substantially that of air to any increase in magnetomotive force above the value capable of producing saturation in the section. It is evident that the circuits represented by 40 and 41 will offer substantially the same reluctance to the increase in magnetomotive force above the value G and it follows that the flux threading the windings 26 and 27 will increase substantially the same amount with an increase in the magnetomotive force above the value G. The line EH (parallel to AB) represents a constant value of flux and represents the saturated flux of 22 threading the winding 26 due to the characteristics of 22 as a magnetic substance, this flux being called the intrinsic flux. The increase in flux threading 22 and hence 26 due to the section 22 having the reluctance of air for increases in magnetomotive force above G is called the spatial flux, this being represented by the difference between EH and EF since EF represents the total flux threading 22 and 26. It should now be obvious that the spatial flux threading the winding 26 will increase at the same rate as the flux threading the winding 27 and therefore EF is parallel to AD.

The rotation of magnet 14, Fig. 1, induces an alternating voltage in the windings 11. It should be clear that if an indicating instrument is energized directly from the terminals of the windings 11 and if the instrument is calibrated to give correct speed indications with the then existing flux strength of magnet 14 and a change in the strength of 14 occurs due to vibration, temperature change, age, etc. the instrument will give erroneous speed indications and this will also be true if the usual type of transformer is interposed between the terminals of the winding 11 and the indicating instrument.

A brief explanation follows of how my novel construction of the transformer produces substantially accurate speed indications of the instrument even with large changes in the strength of the magnet 14. The alternating voltage of the winding 11 energizes the winding 25 with alternating current and produces an alternating magnetomotive force in the transformer 16. A change in speed of 14 increases or decreases the voltage and frequency of the generator 10 in practically the same ratio and although the resistances of the windings 11 and 25 are small compared to their reactances it follows that the current in 25 and hence the magetomotive force in 16 will increase with increase in speed of 14 and vice versa. Alternating voltages are induced in the windings 26 and 27 and during one-half cycle the resultant voltage of these windings causes a current to flow through 33, 38 and 35 as shown by their arrows and during the other half cycle the current flows through 36, 38 and 34 as shown by their arrows, thus giving full wave rectification and hence a unidirectional fluctuating current in 38. The indicating element of 38 is unable to follow the fluctuations in the values of the current passing through it and hence it assumes a position corresponding to the average current flowing through it. The average current flowing in 38 is substantially proportional to the average resultant voltage of the windings 26 and 27 since the high resistance 37 causes the resistance of the entire secondary circuit to be high compared to the reactance of the entire secondary circuit. The average resultant voltage of the windings 26 and 27 is the difference between the average voltage of each winding. The average voltage induced in the winding 26 is equal to $4FN\Phi^{max1} \cdot 10^{-8}$, where F and $\Phi^{max1}$ respectively represent the frequency and maximum value of the flux threading 26 and N represents the number of turns in 26. The average voltage induced in the winding 27 is equal to $4FN\Phi^{max2} \cdot 10^{-8}$ where F and $\Phi^{max2}$ respectively represent the frequency and maximum value of the flux threading 27 and N represents the number of turns in 27. The value of F is the same for both windings and the value of N has been assumed the same for both windings and therefore the resultant voltage of the windings 26 and 27 is equal to $4FN10^{-8}$ ($\Phi^{max1}-\Phi^{max2}$). By referring to Fig. 2, for the maximum values of the flux threading the coils 26 and 27 respectively, it will be clear that at the speed of 14 (Fig. 1), corresponding to the transformer magnetomotive force G (Fig. 2), the resultant voltage of windings 26 and 27 is equal to $4FN10^{-8}$ (J—K) and therefore equal to $4FN10^{-8}L$, since JL is equal to AK. If the speed of 14 is increased to give a transformer magnetomotive force M, the resultant voltage of windings 26 and 27 is equal to $4FN10^{-8}$ (N—P) and therefore equal to $4FN10^{-8}L$, since NL is equal to AP. If the speed of 14 is further increased to give a transformer magnetomotive force R, the resultant voltage of windings 26 and 27 is equal to $4FN10^{-8}$, (S—T) and therefore equal to $4FN10^{-8}L$, since SL is equal to AT and similarly at the speed corresponding to the magnetomotive force B the resultant voltage will be equal to $4FN10^{-8}L$, since CL is equal to AU. It is obvious that at speeds of 14 corresponding to transformer magnetomotive forces at and above the value represented by G the section 22 will become saturated during a part of each alternation of the magnetomotive force and therefore the resultant voltage of the windings 26 and 27 will be directly proportional to the value of F because L has a constant value and since F is directly proportional to the speed of 14, it follows that the resultant voltage and hence the indications of 38 will be directly proportional to the speed of 14.

Assume that the magnet 14 is directly driven by the engine whose lowest speed to be indicated is 500 R. P. M. The windings 11 and 25 will be so proportioned that at 500 R. P. M. the transformer 16 will have a magnetomotive force well above the minimum value capable of saturating 22 during a part of each alternation of the magnetomotive force, so that if the strength of the magnet 14 decreases due to age, vibration, temperature change, etc. or if the resistance of windings 11 and 25 increases due to temperature changes, or if both things happen, there will still be sufficient magnetomotive force left to saturate 22 during a part of each alternation of the magnetomotive force, this saturation of 22 being necessary to obtain indicating accuracy of 38. The minimum value of magnetomotive force capable of saturating 22 during a part of each alternation of the magnetomotive force is represented by G and therefore the windings 11 and 25 are proportioned so that at 500 R. P. M. the transformer will have a magnetomotive force as represented, for example, by M. From the explanation previously given it should be clear that 38 will accurately indicate the speed of 14 at and above 500 R. P. M. and actual tests I have conducted showed an indicating error of less than 1% which is sufficiently accurate for practically all purposes. To reproduce the effect of a decreased strength of magnet 14 caused by temperature change, age, vibration, etc., I conducted tests where I reduced the voltage applied to winding 25 to a considerably lower value than the voltage of 10 corresponding to its speed and the indicating error of 38 was less than 1%. The instrument 38 is of the sensitive direct current type and has equal deflections for equal increments of current passing through it and I therefore obtain the additional advantage of highly sensitive easy reading indications throughout the indicating range.

It is obvious that the indicating accuracy of 38, (Fig. 1) will not be appreciably affected if winding 27 surrounds a nonmagnetic section secured to the unbridged ends of legs 17 and 18. The indicating accuracy of 38 will not be greatly affected if winding 27 surrounds a part of the leg 17 or 18 lying between their unbridged ends and the leg 19, or if the winding 26 surrounds a part of the leg 17 or 18 lying between the section 22 and the leg 19. I have described my invention with the air gap 28 having the length of the section 22 and with windings 26 and 27 having the same number of turns, but it is obvious that the voltage induced in winding 27 will not be appreciably changed if the air gap 28 and the number of turns in 27 are both doubled or both halved and therefore the indicating accuracy of 38 will not be appreciably affected and it follows that no prescribed length of air gap 28 or number of turns in 27 is necessary. It is only necessary that the magnetic circuit represented by 41 should have at least one restricted magnetic section and the magnetic circuit represented by 40 should have at least one section having a reluctance substantially that of air and the relations between the number of turns in the windings 26 and 27 and the reluctance of their respective magnetic circuits 41 and 40 should be such that changes in the transformer magnetomotive force above the value capable of saturating the restricted section produces substantially equal changes in the induced voltages of the windings 26 and 27.

Aircraft are subjected to great variations in temperature and as the secondary windings 26 and 27 and the indicating element of 38 are usually made of copper, their resistances will decrease with decreased temperature and vice versa, whereas the copper oxide rectifier 32 increases in resistance with decreased temperature and vice versa. The change in resistance of 32 is usually greater than the combined change in resistance of 26, 27 and 38 and if not compensated for, 38 would read low with decreasing temperature and high with increasing temperature. To prevent these errors I provide a resistance 37 having a zero or very slight negative temperature coefficient and whose resistance is many times the combined resistance of 26, 27 and 38, whereby with temperature variations the per cent change in resistance of the entire circuit will be very small and the current in 38 will be very nearly proportional to the resultant voltage of 26 and 27. In addition, I connect across 38 a resistance 39 having a zero or very slight negative temperature coefficient so that with decreasing temperature a larger portion of the rectifier current will flow through 38 and with increasing temperature a smaller portion of the rectifier current will flow through 38. If suitable values of 37 and 39 are selected the instrument 38 will give nearly perfect indications over a wide range of temperature.

I have described my invention in connection with speed indications but it is evident that 38 may be used to indicate the frequency of 10 or the primary winding 25 may be connected to an alternating current system whose frequency will be indicated by 38. I have conducted tests by which I obtained an indicating device having high accuracy, light weight and good efficiency by making the permanent magnet 14 of cobalt steel, thus reducing the weight for a given amount of flux and by making the laminations of the transformer 16 of permalloy.

In describing my invention I have illustrated one form of construction for the legs of the transformer and one form of arrangement for the secondary windings but obviously many modifications will readily suggest themselves to those skilled in the art without departing from the principles of my invention. I therefore wish it understood that the embodiment represented is merely illustrative and that all modifications coming within the true spirit and scope of my invention are intended to be included in the scope of the appended claims.

What I claim as new and desire to secure by Letters Patent of the United States, is:

1. A transformer comprising a core having two magnetic circuits, one of said circuits containing a restricted magnetic section and the other circuit containing an air gap whose length is substantially equal to the length of said restricted section, a primary winding surrounding portions of both of said magnetic circuits, a secondary winding surrounding a portion of one magnetic circuit, another secondary winding surrounding a portion of the other magnetic circuit, the said secondary windings having substantially the same number of turns, and means for connecting said secondary windings in series so that their induced voltages will oppose each other.

2. A transformer comprising a magnetic core consisting of a pair of laterally displaced substantially parallel legs joined at their centers by a connecting leg and a restricted magnetic section bridging two corresponding ends of said substantially parallel legs, said connecting leg and said restricted magnetic section being substantially perpendicular to said parallel legs, a primary winding surrounding said connecting leg, a secondary winding surrounding said restricted section, another secondary winding placed between the unbridged ends of said substantially parallel legs, the said secondary windings having substantially the same number of turns, and means for connecting said secondary windings in series so that their induced voltages will oppose each other.

3. A transformer comprising a magnetic core consisting of a pair of laterally displaced substantially parallel legs, a restricted magnetic section bridging two corresponding ends of said substantially parallel legs, and a connecting leg joining said parallel legs at places located between the bridged and unbridged ends thereof; a primary winding surrounding said connecting leg, a secondary winding surrounding said restricted section, another secondary winding placed between the unbridged ends of said substantially parallel legs, the said secondary windings having substantially the same number of turns, and means for connecting said secondary windings in series so that their induced voltages will oppose each other.

4. A transformer comprising a magnetic core consisting of two laterally displaced substantially parallel legs with a connecting leg and a restricted section joining said parallel legs at separated places thereon, a primary winding surrounding said connecting leg, a secondary winding surrounding said restricted section, another secondary winding located in space between the sides of said parallel legs, the said secondary windings having substantially the same number of turns, and means for connecting said secondary windings in series so that their induced voltages will oppose each other.

5. A transformer comprising a magnetic core having two magnetic circuits of substantially equal length, one of said magnetic circuits containing a restricted magnetic section and the other of said magnetic circuits containing an air gap whose length is substantially equal to the length of said restricted section, a primary winding surrounding portions of both of said magnetic circuits, a secondary winding surrounding said restricted section, another secondary winding located in said air gap, the said secondary windings having substantially the same number of turns, and means for connecting said secondary windings in series so that their induced voltages will oppose each other.

6. A transformer comprising a magnetic core having two magnetic circuits of substantially equal length, one of said magnetic circuits containing a restricted magnetic section and the other of said magnetic circuits containing an air gap, a primary winding surrounding portions of both of said magnetic circuits, a secondary winding surrounding said restricted section, another secondary winding located in said air gap, the relation between the number of turns of said secondary windings and the reluctances of said magnetic circuits when said restricted section is saturated being such that changes in the magnetic flux threading said magnetic circuits above the value producing substantial saturation of said restricted section will cause substantially equal changes in the voltages induced in said secondary windings and means for connecting said secondary windings in series so that their induced voltages will oppose each other.

7. A transformer comprising a magnetic core having two magnetic circuits, a primary winding surrounding portions of both of said magnetic circuits, whereby an alternating magnetic flux will thread said magnetic circuits when an alternating voltage is impressed on said primary winding, one of said magnetic circuits containing a restricted magnetic section dimensioned to be completely saturated when the minimum operating voltage is impressed on said primary winding and the other magnetic circuit containing a section having a reluctance substantially that of an equally long air gap, a secondary winding surrounding a portion of one magnetic circuit, another secondary winding surrounding a portion of the other magnetic circuit, the relation between the number of turns of said secondary windings and the reluctances of said magnetic circuits when said restricted section is saturated being such that changes in the magnetic flux threading said magnetic circuits above the value producing substantial saturation of said restricted section will cause substantially equal changes in the voltages induced in said secondary windings and means for connecting said secondary windings in series so that their induced voltages will oppose each other.

In witness whereof, I have hereto set my hand this 16th day of August, 1930.

ARNOLD J. ROHNER.